Patented Aug. 7, 1951

2,563,087

UNITED STATES PATENT OFFICE 2,563,087

SEPARATION OF THIOPHENE BY SELECTIVE ALKYLATION

Jerome A. Vesely, Evanston, Ill., assignor to Universal Oil Products Company, Chicago, Ill., a corporation of Delaware No Drawing. Application June 28, 1946, Serial No. 680,060

5 Claims. (Cl. 260—329)

The present invention relates to the separation of thiophene from mixtures of the same with hydrocarbons, particularly aromatic hydrocarbons, by the preferential alkylation of said thiophene compound in the mixture and separation of the resultant thiophene alkylate from the product. The invention further relates to the preparation of alkyl thiophene derivatives as byproducts of the separation process.

The problem of removing thiophene from mixtures containing predominantly aromatic hydrocarbons, particularly benzene and/or toluene, has presented itself since the commercial necessity for the production of relatively pure aromatic hydrocarbon products and especially in the industrial manufacture of food and drug products. The problem arises particularly in the production of pure benzene and/or toluene because of the difficulty of separating these hydrocarbons from thiophene by purely physical means such as fractionation or solvent extraction. Benzene or toluene, for example prepared by the destructive distillation of coal contains appreciable quantities of thiophene which for many purposes is desirably removed before utilization. Heretofore, when the purified hydrocarbon was desired, the generally recognized method of removing the thiophene was that of washing the mixture with a reagent which preferentially reacted with the thiophene, such as sulfuric acid and converted the thiophene to a derivative thereof which could be separated from the remaining benzene and/or toluene with relative ease. When utilizing this method, however, the valuable thiophene compound was converted into a material from which the thiophene could not be recovered and which had little or no utility as such. Although the desired aromatic hydrocarbon was thereby purified of its thiophene contaminant, the thiophene, a valuable by-product, was in effect destroyed.

According to the present process for the removal of thiophene from admixture with aromatic hydrocarbons, the original mixture is contacted with an alkylating agent in the presence of an alkylation catalyst under alkylating conditions maintained sufficiently severe to selectively alkylate substantially all of the thiophene component but under conditions sufficiently mild to leave the aromatic hydrocarbon unaltered by the reaction, permitting the latter to be recovered, for example, by fractionation, in its original state, free of the thiophene contaminant.

One object of my invention is to provide a process for the removal of a thiophene contaminant from admixture with hydrocarbons, particularly aromatic hydrocarbons.

It is another object of my invention to prepare valuable alkyl derivatives of thiophene useful as intermediates in the preparation of medicinals, germicides, insecticides and the like.

Another object of my invention is to provide a method for selectively alkylating thiophenes contained in a mixture of the same with aromatic hydrocarbons, and to separate the resultant thiophene alkylates from the reaction mixture formed thereby.

In one embodiment, my invention comprises subjecting an aromatic hydrocarbon fraction containing a thiophene contaminant and from which it is desired to remove said contaminant to alkylation in the presence of an olefin-acting organic compound and separating the thiophene alkylate from the resultant product.

In a specific embodiment thereof, my invention comprises mixing an impure benzene fraction contaminated by thiophene with an olefinic hydrocarbon, preferably a tertiary olefin, contacting the mixture with an alkylation catalyst selected from the group comprising an anhydrous Friedel-Crafts metal halide, hereinafter more specifically designated, a phosphoric acid, or a mixture of a phosphoric acid with sulfuric acid containing optimum proportions of each component, and fractionating the resultant mixture of thiophene alkylate and benzene to separate the alkylated thiophene.

Other embodiments of this invention concern the application of the process to the separation of specific hydrocarbon fractions, the use of specific alkylation catalysts and olefin-acting alkylating agents and to other factors involved in the present separation process, more fully referred to in the following specification.

The olefin-acting alkylating agents utilizable herein include compounds capable of yielding alkyl groups under the conditions of operation employed in this process. Compounds of this type include olefins, both normally gaseous and normally liquid and both aliphatic and cyclic, mercaptans, mineral acid esters, such as alkyl halides, and alkoxy compounds of the class consisting of the aliphatic alcohols, ethers, and esters of carboxylic acids. The alkylating agents herein mentioned desirably possess such physical properties that any excess of such agent, not consumed in the alkylation reaction, may be readily recovered from the resultant products of alkylation and unreacted aromatic hydrocarbons by simple separating means, such as by distillation.

The various olefin-acting alkylating agents herein specified have the property of producing alkyl groups as intermediates during the course of the alkylation reaction which results in the formation of alkylated thiophene compounds. These alkylating agents are not to be regarded as equivalent; for milder operating conditions are necessary when processing olefins, for example, than when processing ethers. Similarly, substituted cyclic olefins are more easily reacted than non-substituted members of this class of compounds. Also, branched chain aliphatic olefins, such as isobutylene, alkylate thiophene more readily than straight chain olefins, such as normal butene. In general, olefinic hydrocarbons that are most useful as alkylating agents in the present process and which yield thiophene alkylates most readily comprise the tertiary olefins, defined structurally as hydrocarbons containing the group: $R_2C=CH_2$, where R is an alkyl group such as a methyl, ethyl, propyl, etc. radical and which may be represented by such hydrocarbons as 2-methylpropene-2 and 3-methylbutene-2.

Alkylating catalysts which may be utilized in the present process to effect the selective alkalation of thiophene in the presence of aromatic hydrocarbons generally comprise those selected from the following group of catalysts herein referred to as "alkylation catalysts": (1) The Friedel-Crafts metal halides, preferably in an anhydrous condition, comprising particularly stannic chloride, the aluminum halides (aluminum bromide and aluminum chloride), ferric chloride, bismuth chloride, zirconium chloride, zinc chloride, antimony pentachloride, etc., said metal halides being utilizable as such or as a composite in which the metal halide is supported by a substantially inert carrier such as crushed quartz, glass, alumina, porcelain, or other granular material having in itself no adverse effect upon the thiophene charged or its alkyl derivatives formed in the process. (2) A phosphoric acid, preferably pyrophosphoric acid, or a mixture of the same with sulfuric acid in which the volume ratio of sulfuric to phosphoric acid is less than about 4:1. In general, it is preferred that such mixtures contain the substantially anhydrous acids, but alkylation is nevertheless obtained with mixtures containing up to about 10% water. (3) A mixture of a phosphoric acid (preferably ortho- or pyrophosphoric acid) and a siliceous adsorbent, such as kieselguhr or a siliceous clay, subsequently calcined to a temperature of from about 400° to about 500° C. to form a silico-phosphoric acid combination generally referred to in the art as a "solid phosphoric acid" catalylst. The preparation of such alkylation catalysts is described in U. S. Patent #2,120,702 and others. For the selective alkylation of thiophene in the presence of aromatic hydrocarbons, I prefer to utilize the above named pyrophosphoric acid, either alone or in combination with a siliceous adsorbent as the so-called "solid phosphoric acid" catalyst.

The present invention may be carried out in batch operation by placing a quantity of the above described alkylation catalyst in a reactor equipped with a stirring device, adding the impure aromatic hydrocarbon from which it is desired to remove the thiophene contaminant, heating to a reaction temperature, slowly adding the olefin-acting alkylating agent while mixing the contents of the reactor, subsequently cooling the reaction mixture and recovering the alkyl thiophene product therefrom. The preferred method of operation, however, is of the continuous type in which the alkylation catalyst is continuously charged into a stirred reactor together with the aromatic hydrocarbon mixture of thiophene and the alkylating agent. The reactor effluent is thereafter passed to a settler wherein a separation is effected between the catalyst phase and the hydrocarbon phase. At least a portion of the catalyst phase is continuously recycled to the reaction zone and the hydrocarbon-thiophene alkylate phase is processed for recovery of the desired products. Unconverted materials may be recycled to the reactor.

The separation of thiophene from a mixture of the same and aromatic hydrocarbons by the selective alkylation of said thiophene is effected by the careful control of the alkylation reaction temperature which may range from about —20° to about 85° C. and is preferably maintained within the range of from about 0° to about 60° C., although the particular temperature utilized in any specific reaction will depend to some extent upon the particular mixture of aromatic hydrocarbons and thiophene charged, upon the particular olefin-acting alkylating agent utilized in the reaction, and especially upon the alkylation catalyst employed in the process. The lower temperatures of the above range, for example, are not generally preferred when a mixture of hydrocarbons having a relatively high melting point is being treated, while temperatures in the upper limits of the above range are not generally preferred when utilizing highly active catalysts, such as a mixture of phosphoric and sulfuric acids. It has been observed that at temperatures above the indicated range (that is above 85° C.) the reaction tends to be less selective and increasing proportions of the aromatic component of the mixture is alkylated along with the thiophene. It is also observed that at higher temperatures the thiophene and its alkylated product tend to decompose into tarry-like material, especially when the more reactive alkylation catalysts are utilized in the reaction. The pressure should be such that substantially all of the reactants are maintained in liquid phase during the reaction, and in general, pressures of from about 1 atomsphere to about 100 atmospheres are sufficient for this purpose. The contact time will, of course, depend upon the activity of the catalyst utilized, but generally, reaction periods exceeding about 3 minutes up to about 3 hours are effective in obtaining almost quantitative yields of the thiophene alkylate. Although, as a general rule, it is preferred to maintain an excess of the olefin-acting alkylating agent in the mixture in order to insure substantially complete removal of the thiophene, under some circumstances, especially when a monoalkylated thiophene product is desired, the amount of alkylating agent introduced into the mixture may be such as to result in a molecular excess of the thiophene reactant in the mixture.

The following examples are presented to illustrate the nature of the process and the method of its operation but they are not to be construed as limiting the scope of the invention in any of its aspects.

*Example I*

A commercial technical benzene product analyzing 0.12% organically combined sulfur as thiophene is mixed with about 0.5 weight proportion of isobutylene and contacted with pyrophosphoric acid catalyst at a temperature of from about 20° to about 30° C. while the reaction mixture is maintained under a pressure of about 5 atmospheres of nitrogen. The mixture is stirred for one-half hour and allowed to settle into an upper hydrocarbon-containing phase and a lower catalyst-containing layer, the two layers being separated by decantation and individually treated. The upper phase containing predominantly hydrocarbons and thiophene alkylate is fractionally distilled to separate said thiophene alkylates from unreacted benzene. The separated benzene when analyzed for sulfur contains no detectable traces of organically combined sulfur. The alkyl thiophenes separated from the effluent products contain from 1 to 3 tertiary butyl groups per molecule of alkylate. The recovered catalyst-containing phase may be recycled to the initial alkylation reactor for further utilization therein.

*Example II*

A synthetic mixture of pure toluene and thiophene, containing 1.5 weight per cent of thiophene, is mixed with 0.5 weight proportion of isobutylene and thoroughly stirred with a sulfuric-phosphoric acid catalyst mixture containing two volume proportions of sulfuric acid. The temperature is maintained at about 10 to 20° C. at a pressure of about 2 atmospheres of nitrogen for a period of one hour when the mixture is allowed to settle and separate into two phases. The upper hydrocarbon-containing phase is separated and fractionally distilled to segregate the alkyl thiophene product from unreacted toluene. The toluene fraction when analyzed for sulfur contains no detectable traces of thiophene as indicated by a negative sulfur test.

I claim as my invention:

1. A process for the separation of thiophene from a mixture thereof with an aromatic hydrocarbon selected from the group consisting of benzene and toluene, which comprises subjecting the mixture to selective alkylation with an olefin-acting alkylating agent in the presence of an alkylation catalyst comprising a phosphoric acid at a temperature of from about 10° to about 30° C. so as to alkylate only the thiophene, and fractionally distilling the resultant mixture of alkylated thiophene and unreacted aromatic hydrocarbon to separate the former from the latter.

2. The process of claim 1 further characterized in that said catalyst comprises a mixture of sulfuric and phosphoric acids and said temperature is between 10° and about 20° C.

3. The process of claim 1 further characterized in that said alkylating agent comprises an olefinic hydrocarbon.

4. The process of claim 1 further characterized in that said alkylating agent comprises isobutylene.

5. The process of claim 1 further characterized in that said catalyst comprises pyro-phosphoric acid and said temperature is between 20° and about 30° C.

JEROME A. VESELY.

REFERENCES CITED

The following references are of record in the file of this patent:

UNITED STATES PATENTS

| Number | Name | Date |
|---|---|---|
| 1,590,965 | Downs | June 29, 1926 |
| 1,991,844 | Campbell et al. | Feb. 19, 1935 |
| 2,066,695 | Ipatieff | July 2, 1935 |
| 2,141,611 | Malishev | Dec. 27, 1938 |
| 2,277,115 | Kruger | Mar. 24, 1942 |
| 2,311,189 | Peterson | Feb. 16, 1943 |
| 2,346,524 | Von Lauer | Apr. 11, 1944 |
| 2,396,144 | Anderson | Mar. 5, 1946 |
| 2,405,874 | Bullard | Aug. 13, 1946 |
| 2,450,652 | Francis | Oct. 5, 1948 |

FOREIGN PATENTS

| Number | Country | Date |
|---|---|---|
| 211,239 | Germany | June 29, 1909 |